(12) United States Patent
Huseby et al.

(10) Patent No.: US 9,251,790 B2
(45) Date of Patent: Feb. 2, 2016

(54) APPARATUS AND METHOD FOR INSERTING MATERIAL INTO TRANSCRIPTS

(71) Applicant: HUSEBY, INC., Charlotte, NC (US)

(72) Inventors: Steven Stuart Huseby, Roswell, GA (US); Scott Allen Huseby, Sr., Mooresville, NC (US); Bradley Charles Wickard, Charlotte, NC (US)

(73) Assignee: HUSEBY, INC., Charlotte, NC (US)

( * ) Notice: Subject to any disclaimer, the term of this patent is extended or adjusted under 35 U.S.C. 154(b) by 178 days.

(21) Appl. No.: 14/059,994

(22) Filed: Oct. 22, 2013

(65) Prior Publication Data

US 2014/0114657 A1 Apr. 24, 2014

Related U.S. Application Data

(60) Provisional application No. 61/716,744, filed on Oct. 22, 2012.

(51) Int. Cl.
*G10L 15/26* (2006.01)
*G06Q 30/02* (2012.01)

(52) U.S. Cl.
CPC ............ *G10L 15/26* (2013.01); *G06Q 30/0241* (2013.01)

(58) Field of Classification Search
CPC ........ G10L 15/00; G10L 15/26; G10L 15/265
USPC ........................................................ 704/235
See application file for complete search history.

(56) References Cited

U.S. PATENT DOCUMENTS

| | | | |
|---|---|---|---|
| 6,510,417 B1 * | 1/2003 | Woods et al. ................. 704/275 |
| 7,640,240 B2 * | 12/2009 | Boal et al. |
| 2007/0239446 A1 * | 10/2007 | Bennett .................... G06F 17/24 704/235 |
| 2008/0154716 A1 * | 6/2008 | Meazoa .......................... 705/14 |
| 2008/0244666 A1 * | 10/2008 | Moon et al. ..................... 725/87 |
| 2008/0288341 A1 | 11/2008 | Garbe et al. |
| 2009/0222510 A1 * | 9/2009 | van Riel ........................ 709/203 |
| 2009/0254824 A1 * | 10/2009 | Singh ............................ 715/716 |
| 2009/0326947 A1 * | 12/2009 | Arnold et al. ................. 704/257 |
| 2010/0063815 A1 * | 3/2010 | Cloran et al. ................. 704/235 |
| 2010/0241963 A1 * | 9/2010 | Kulis et al. .................... 715/727 |
| 2010/0268534 A1 * | 10/2010 | Kishan Thambiratnam et al. ............................ 704/235 |
| 2010/0274667 A1 * | 10/2010 | Lanham et al. ............ 705/14.49 |
| 2011/0295687 A1 * | 12/2011 | Bilenko et al. ............. 705/14.54 |
| 2012/0078626 A1 * | 3/2012 | Tsai et al. ..................... 704/235 |
| 2012/0215630 A1 * | 8/2012 | Surendran et al. ......... 705/14.49 |
| 2012/0284093 A1 * | 11/2012 | Evans ......................... 705/14.1 |
| 2013/0124984 A1 * | 5/2013 | Kuspa .......................... 715/255 |
| 2013/0155076 A1 * | 6/2013 | Wodka et al. ................. 345/502 |
| 2013/0275129 A1 * | 10/2013 | Paden .......................... 704/235 |
| 2013/0311181 A1 * | 11/2013 | Bachtiger et al. ............. 704/235 |
| 2013/0325462 A1 * | 12/2013 | Somekh et al. .............. 704/235 |
| 2014/0104292 A1 * | 4/2014 | Radostitz ..................... 345/589 |

* cited by examiner

*Primary Examiner* — Douglas Godbold
(74) *Attorney, Agent, or Firm* — Shumaker, Loop & Kendrick, LLP

(57) ABSTRACT

A system and method for placing and displaying advertising into a document including transcribing text in real-time in a recording device; communicating the transcribed text to a computer configured to embed an advertisement into the transcribed text; receiving a request from a user to access the transcribed text with the embedded advertisement; and communicating the transcribed text with the embedded advertisement to a user's peripheral device.

13 Claims, 10 Drawing Sheets

APPARATUS AND METHOD FOR INSERTING MATERIAL INTO TRANSCRIPTS

CROSS REFERENCE TO RELATED APPLICATIONS

This application claims priority to U.S. patent application Ser. No. 61/716,744 filed on Oct. 22, 2012, the contents of which are incorporated herein by reference.

TECHNICAL FIELD AND BACKGROUND OF THE INVENTION

The present invention relates to a computer-based apparatus and method for inserting content, such as advertising, promotional materials or public service announcements or postings into transcripts, such as depositions, trial and hearing transcripts, and medical transcripts. As used in this application, the term "advertising" or "advertising materials" refers to all of these types of placements, among others. The invention has particular application to real-time transcription, which is the general term for transcription by, for example, court reporters using transcription machines and real-time text technologies to deliver text to computer screens substantially in real-time (i.e., within a few seconds of the words being spoken). Specialized software allows participants in, for example, court hearings or depositions to make notes in the text and highlight portions for future reference and search within the files for particular terms or phrases, among other features. If the proceeding is video recorded, the video can be synchronized with the text for playback. This type of transcription is becoming more commonly used as computer speed and software sophistication permit more and more accurate transcription using these techniques. As speech recognition software gains in speed and accuracy, it is anticipated that deposition, court and hearing transcripts will more commonly be prepared using direct speech to text software.

Many transcript fees including, but not limited to, deposition charges are normally based on a base fee per transcript page, plus extra charges for compressed transcripts, searchable indices, advance ASCII copies and the like. While providing enhanced utility, transcripts using these features are typically substantially more expensive than transcripts that are transcribed and later furnished after editing, proofing, etc. Therefore, in order to lessen costs associated with obtaining these transcripts, there is a need for a system of furnishing transcripts that generates revenue from third parties rather than charges solely to the transcript purchasers. Third party purchasers include, for example, litigation support providers, database providers such as Lexis-Nexis and Westlaw, bar and legal associations, law schools, and the like.

As more broadly envisioned, the system described in this application is not limited to any specific form of transcript creation by capturing spoken words, and anticipates future developments in the field as technology progresses. The system is particularly applicable for use with real-time feeds, i.e., text that is created simultaneously with spoken word and displayed on a screen, stored in digital memory and the like. For example, at a deposition, the resulting rough draft product being prepared in real time can be created with advertising inserted into the text as described in this application, and carried over to the final version of the transcript. Other opportunities include, but are not limited to steno-mask transcription, speech recognition, audio/video transcription, CART ("Communication Access Realtime Translation"), and medical transcription. The use to which the transcript is put or why it is prepared in the first place is not important, but instead the ability of a transcript provider to reduce costs to the end user by spreading part of the cost to third parties who see a benefit in advertising to target transcript users.

Additional features, aspects and advantages of the invention will be set forth in the detailed description which follows, and in part will be readily apparent to those skilled in the art from that description or recognized by practicing the invention as described herein. It is to be understood that both the foregoing general description and the following detailed description present various embodiments of the invention, and are intended to provide an overview or framework for understanding the nature and character of the invention as it is claimed. The accompanying drawings are included to provide a further understanding of the invention, and are incorporated in and constitute a part of this specification.

SUMMARY OF THE INVENTION

It is therefore an object of the present invention to provide an apparatus and method of generating deposition-related revenue by transferring part or all of the transcript cost to third parties when the transcript purchasers are willing to accept transcripts with advertising in return for a lower transcript cost.

It is another object of the invention to provide an apparatus and method of generating deposition-related revenue by transferring part of the transcript cost to third parties when the transcript purchasers are willing to accept transcripts with advertising in return for a lower transcript cost, and wherein the advertising materials are electronically removable so that the transcript can be used at trial, in briefs and appendices without the materials being visible. The system can be shut down for failure to pay the agreed-upon fees.

The methods described herein may include placing and displaying advertising into a document by transcribing text in real-time in a recording device; communicating the transcribed text to a computer configured to embed an advertisement into the transcribed text; receiving a request from a user to access the transcribed text with the embedded advertisement; and communicating the transcribed text with the embedded advertisement to a user's peripheral device. In certain aspects, the embedded advertisement may be removed from the transcribed text when desired.

The system described herein may include a computer having a processor, memory, and an advertisement module. The processor is configured to electronically communicate and receive text transcribed in real-time from a transcription machine, and is further configured to electronically communicate with the advertisement module. The advertisement module is configured obtain and embed an advertisement in the transcribed text. The computer's processor is configured to subsequently communicate the transcribed text with the embedded advertisement to a user's peripheral device. The system is configured to remove the embedded advertisement from the transcribed text when desired.

BRIEF DESCRIPTION OF THE DRAWING FIGURES

The present invention is best understood when the following detailed description of the invention is read with reference to the accompanying drawings, in which.

DETAILED DESCRIPTION OF THE PREFERRED EMBODIMENT

The present invention will now be described more fully hereinafter with reference to the accompanying drawings in which exemplary embodiments of the invention are shown. However, the invention may be embodied in many different forms and should not be construed as limited to the representative embodiments set forth herein. The exemplary embodiments are provided so that this disclosure will be both thorough and complete, and will fully convey the scope of the invention and enable one of ordinary skill in the art to make, use and practice the invention. Like reference numbers refer to like elements throughout the various drawings.

Figure 1:
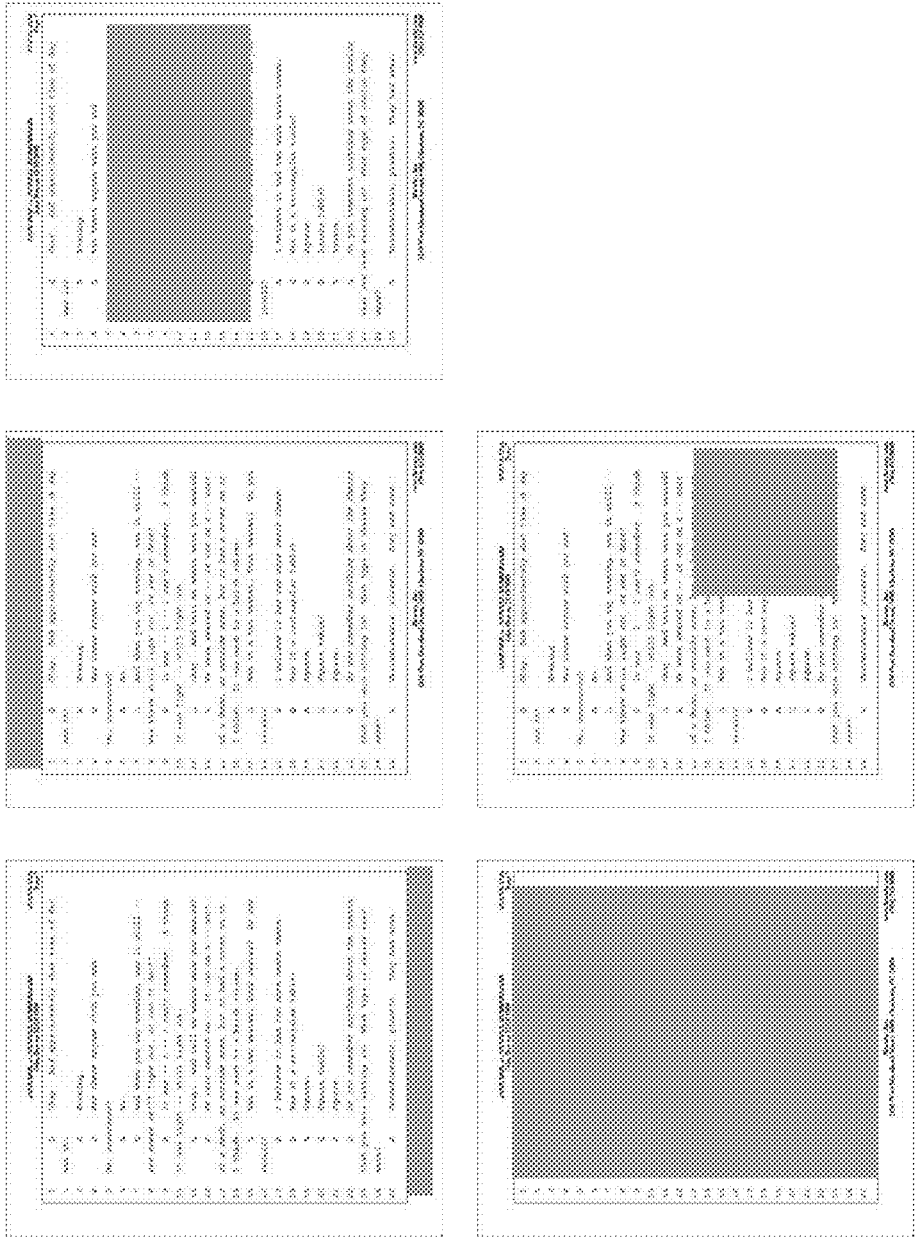
FIG. 1 illustrates several deposition pages with indications of the locations where third party advertising may be placed.

Referring now specifically to FIG. 1, advertising can be placed in any desired location on a particular document page during, for example, a real time feed or a substantially real time feed of an electronically delivered transcribed text. For example, the advertising may be on the cover page, footer, header or text area, and may be size-graduated as a quarter-page, half-page, or full-page—single or double spread.

In certain aspects, the system described herein is format independent or adaptable to various formats. Exemplary formats may include, but are not limited to, word documents, txt. files, PDF files, etc. In certain aspects, Adobe PDF format is a particularly suitable format to serve as a basis for implementation of the system. Such a format, which may be termed PDF/T ("T" for transcript) may be used with a password provided by the service provider (e.g., a court reporting service), and may be convertible when desired into a PDF/A format without the advertising. The PDF/A format may be used, for example, when filing a court document, or for other uses where visible advertising would not be suitable. In additional aspects, the documents having advertisements can be copied and pasted into another document. When this text is copied and pasted into another document, it is preferable to maintain the text's original format such that the advertisements no longer remain in the copied and pasted text.

The system can be offered for sale as a combination of size, percentage transcript coverage, number of pages, hearing advertisements, lines, and duration. For example, a subscriber may choose to purchase the right to place advertisements amounting to 2.5 percent of the space coverage in quarter-page sizes for 100 transcripts, with the fee calculated on the selected combination of size, percentage of coverage and duration.

Figure 2:
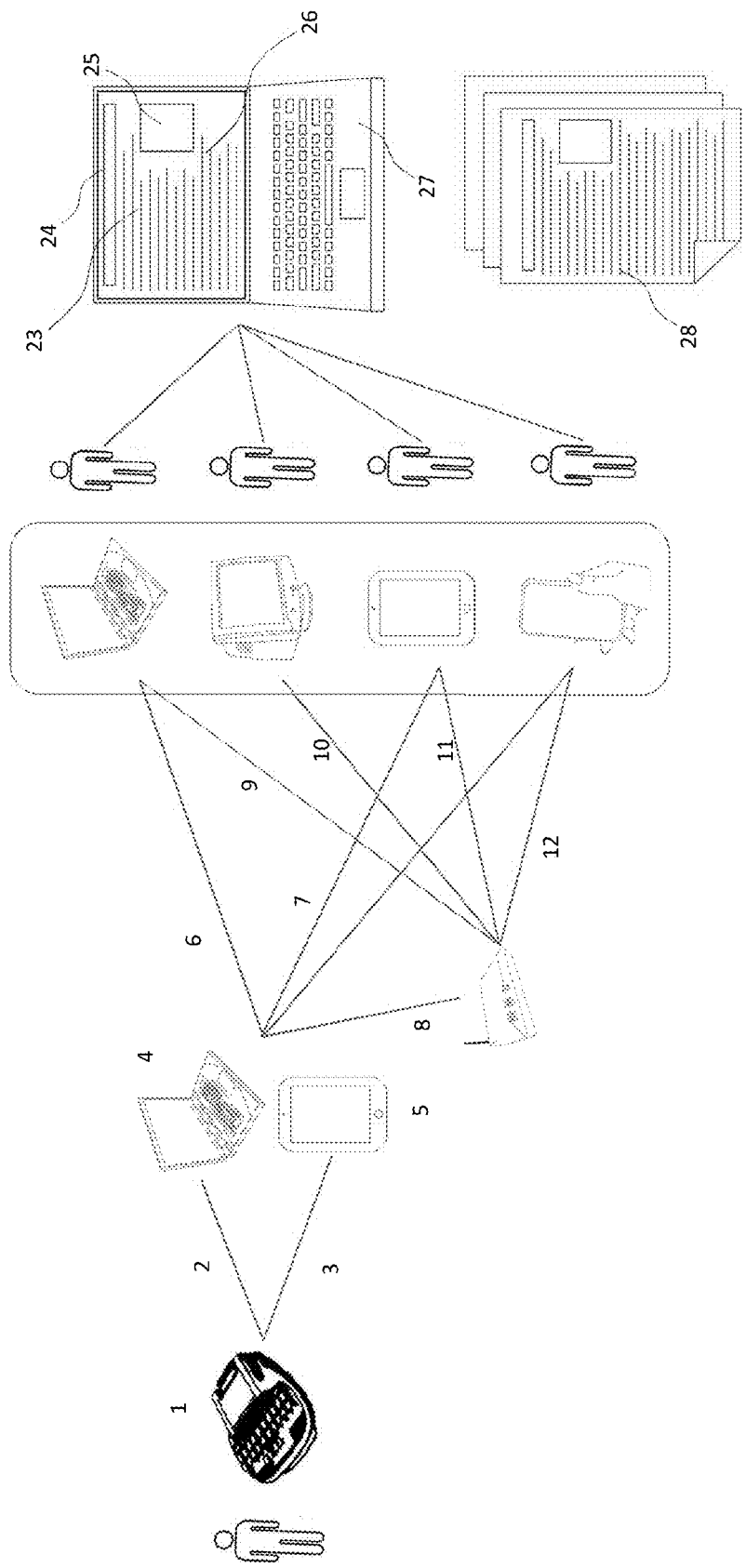
FIG. 2 is a schematic diagram illustrating the components and methods for embedding advertisements within a transcript.

FIG. 2 depicts the systems and methods described herein for placing and displaying advertisements (25) into a document (28). The systems and methods described herein include transcribing text in real-time into a recording device (1). The recording device includes a machine capable of steno-mask transcription, speech recognition, audio/video transcription, CART ("Communication Access Realtime Translation"), stenotype, or medical transcription. This recording device (1) has memory and/or data storage capacity and is capable of communicating the transcribed text to a computer or tablet.

Figure 9:
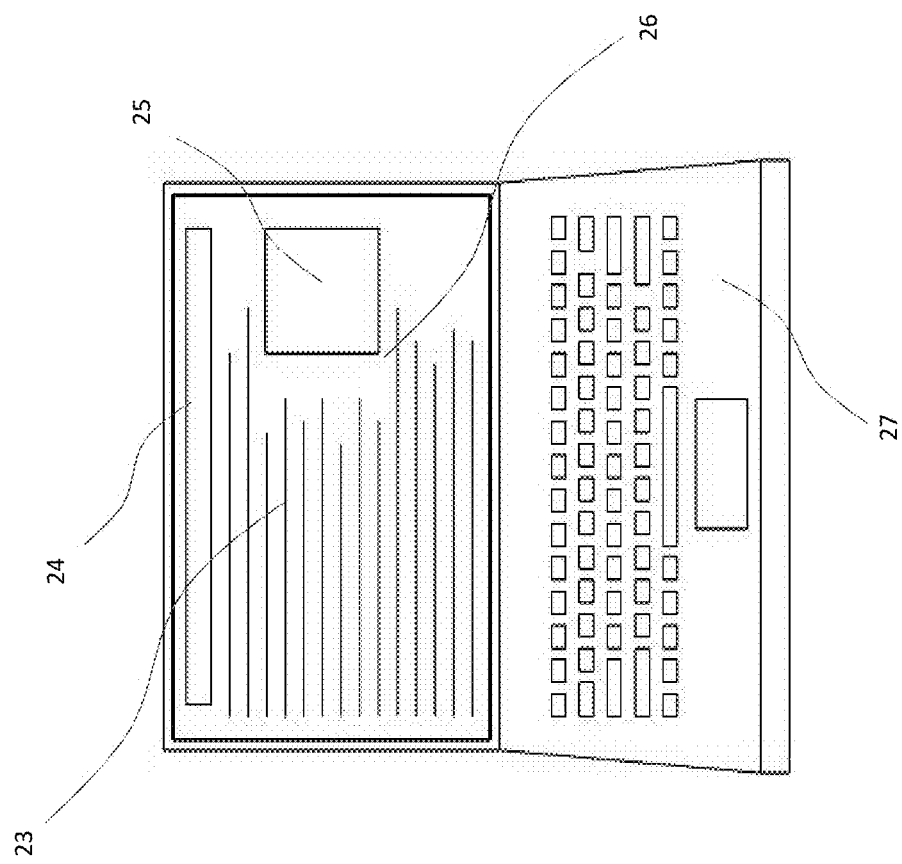
FIG. 9 illustrates an exemplary peripheral device.
Figure 10:
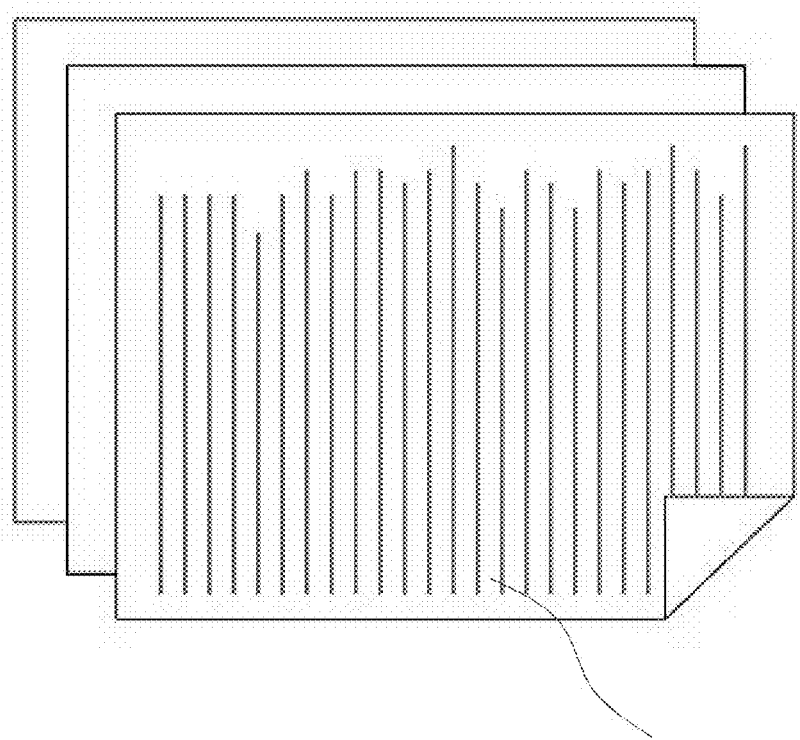
FIG. 10 illustrates a printed document, for example, a PDF/a transcript that does not contain advertisements.

After transcribing the text in real-time into the recording device (1), the transcribed text is subsequently communicated (2, 3) to a computer (4) or tablet (5) or hand held device that is configured to convert the transcribed text into a readable medium (23) while also embedding an advertisement (25) into the transcribed text. The computer or tablet is configured to receive a request from a user to access the transcribed text with the embedded advertisement. The computer or tablet having the transcribed text with an embedded advertisement communicates the transcribed text with the embedded advertisement either directly to a user's peripheral device (6 and 7) or indirectly via a router (8) to a user's peripheral device (9, 10, 11, and 12), which may include, but is not limited to, a laptop, a personal computer, a tablet, a smart phone, etc. For example, FIG. 9 depicts a laptop (27) as the user's peripheral device, which displays the transcribed text (23, 26) with the embedded advertisements (24, 25). In certain aspects, the transcribed text with the embedded advertisement is communicated to a user's peripheral device in real-time or substantially in real-time (i.e., within 1 to 60 seconds, 1 to 30 seconds, 1 to 10 seconds, 1 to 5 seconds, or 1 to 3 seconds of the words being spoken and being transcribed by the recording machine).

In preferred embodiments, the computer (4) or tablet (5) contains an algorithm that permits the user to access a password protected setup screen. After gaining access to a specified, secure area of the system, the setup screen prompts the user to select the ad size and percent coverage, select the advertising art to be uploaded and merged with the transcript, select whether the ad will be displayed in color or black and white, select the page locations, and select the duration, expressed in number of depositions, number of pages, or another suitable criteria. In addition, the user may prefer custom advertising of its own creation, in which case the advertiser would create the advertising display using provided information regarding size, resolution, format and the like, and upload the advertising in the specified format into the court reporting company's server for insertion in the transcript. A user interface may be provided to allow the advertiser to observe the appearance of the advertisement selected on a sample page or pages before a final selection is made. Once the final selection is made, the fee is determined and a charge is made to the advertiser's account, or provision is made for the charge to be paid online with a credit or debit card, or by some other means. The advertisement is merged into the transcript and either printed or prepared for electronic transmission to those transcript purchasers who are willing to pay less for the transcript than for a copy without advertising. This information is stored in a database accessed by the court reporter and/or the transcript user.

Figure 3:
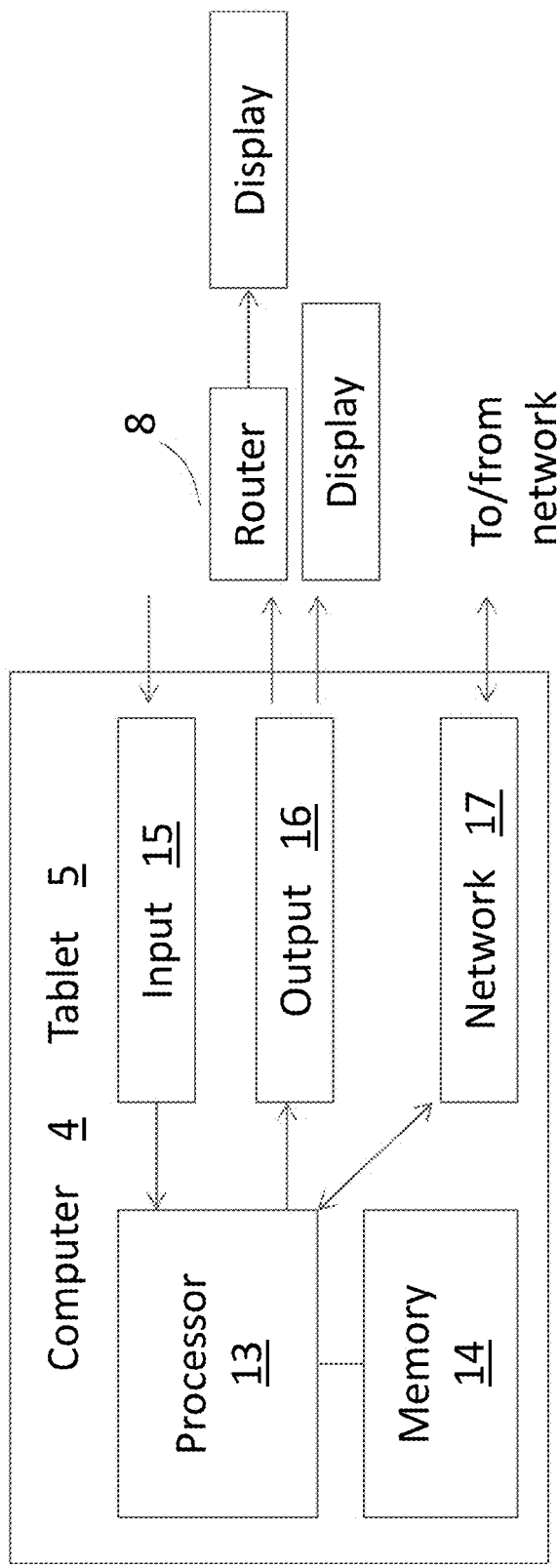
FIG. 3 is a schematic diagram depicting exemplary components of a computer or tablet configured to embed an advertisement into the transcribed text.

FIG. 3 depicts the components within the computer (4) or tablet (5) configured to convert the transcribed text into a readable medium and merge the readable text with one or more advertisements. Specifically, as shown in FIG. 3, the computer (4) or tablet (5) generally includes an input interface (15), a processor (13), memory (14), a means for connecting to a network (17) (e.g., the internet and a web portal)

for communicating data between the computer (4) or tablet (5) and other devices connected and/or attached directly to the network, and an output interface (16) configured to communicate with an external router (8) or directly with a user's peripheral device (9, 10, 11, and 12). The processor (13) is in communication with the memory (14), input interface (15), output interface (16), and the network (17). Although power, ground, clock, and other signals and circuitry are omitted, it should be understood by one having ordinary skill in the art how to implement these features. The transcribed text is communicated (2, 3) from the recording device (1) to the computer (4) or tablet (5) by the input interface (15). The transcribed text is then received and processed by the processor (13) into a readable medium. The processor communicates the readable text to the network (17), and an advertisement may be embedded into the text as depicted, for example, in FIGS. 4 and 6.

In some embodiments, the processor (13) described herein may include a microcontroller or general purpose microprocessor that reads its program from memory (14). The processor may be comprised of one or more components configured as a single unit. Alternatively, when of a multi-component form, processor may have one or more components located remotely relative to the others. One or more components of processor may be of the electronic variety including digital circuitry, analog circuitry, or both. In one embodiment, processor is of a conventional, integrated circuit microprocessor arrangement, such as one or more CORE 2 QUAD processors from INTEL Corporation, or ATHLON or PHENOM processors, One AMD, or POWER6 processors. In alternative embodiments, one or more application-specific integrated circuits (ASICs), reduced instruction-set computing (RISC) processors, general-purpose microprocessors, programmable logic arrays, or other devices may be used alone or in combination as will occur to those skilled in the art.

In various embodiments, the memory (14) described herein may include one or more types such as solid-state electronic memory, magnetic memory, or optical memory, just to name a few. By way of non-limiting example, memory (14) can include solid-state electronic Random Access Memory (RAM), Sequentially Accessible Memory (SAM) (such as the First-In, First-Out (FIFO) variety or the Last-In First-Out (LIFO) variety), Programmable Read-Only Memory (PROM), Electrically Programmable Read-Only Memory (EPROM), or Electrically Erasable Programmable Read-Only Memory (EEPROM); an optical disc memory (such as a recordable, a thumb drive, rewritable, or read-only DVD or CD-ROM); a magnetically encoded hard drive, floppy disk, tape, or cartridge medium; or a plurality and/or combination of these memory types. Also, memory (14) may be volatile, nonvolatile, or a hybrid combination of volatile and nonvolatile varieties.

Figure 4:
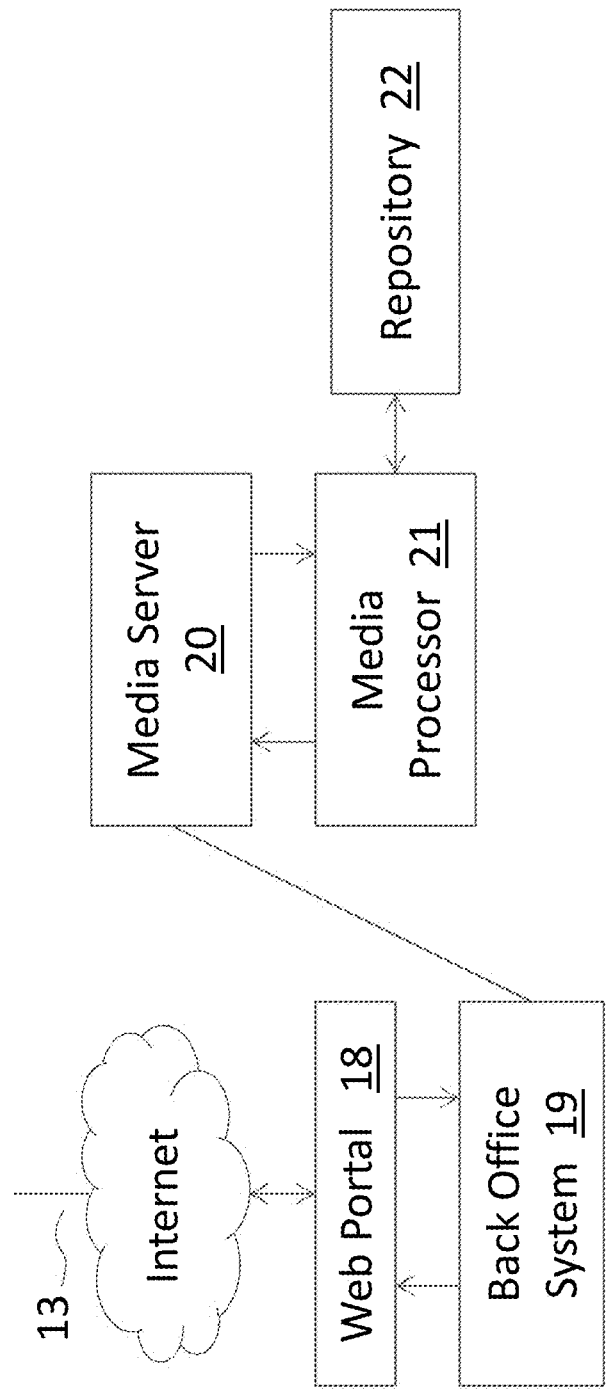
FIG. 4 is a schematic diagram depicting exemplary components used for communicating the transcribed text to a media server so that an advertisement may be embedded into the transcribed text.

As shown in FIG. 4 and upon receiving the transcribed text, the processor (13) may connect to the network interface (17) and route the transcribed text through a data network (e.g., the internet including a web portal (18)) to a media server (20). In certain aspects, "web portals" (18) are any applicable web application server recognized by those skilled in the art configured to route the text described herein to the media server (20). Such web portals may include, but are not limited to, servers built on Zope, J2EE, Zend, or Apache. In certain aspects, the media server (20) is a component of a back office system (19), which includes any applicable application server or database system recognized by those skilled in the art configured to perform the steps described herein.

After routing the transcribed text through the data network, the media server (20) receives the routed text from the processor (13) and connects to a media processor (21) to process and potentially embed one or more advertisements within the transcribed text. Upon the media processor receiving the transcribed text, an advertisement retrieving method is used in parallel with the text stream (i.e., the transcribed text received in media processor (21)) to retrieve advertisement media from a repository (22).

In certain aspects, one or more advertisements stored in the repository are selected based upon various criteria including, but not limited to, advertisement type, size, color, location, or any combination thereof. For example, if the transcribed text pertains to a legal document such as a deposition, a legal advertisement within the repository may be selected from a participating third-party legal support provider such as Lexis-Nexis or Westlaw and the advertisement may be subsequently embedded within the transcribed text. In certain aspects the advertisements may include, but are not limited to, still images, hyperlinks, videos, text, audio content, or any combination thereof. In certain embodiments, the advertisements include a PDF file, a Flash file, an HTML file, a ShockWave file, an SVG file, a GIF, a TIF, a JPEG, or any combination thereof. The file type of the text and the advertisement may be the same or different. In certain aspects, the advertisement may further include a tag. The advertisement embedded within the text may be identified based on this tag or difference in file type, and the advertisement may be subsequently removed from the text if desired using the methods and systems described herein.

After embedding the advertisement in the text, the text embedded with an advertisement may then be routed back to the processor (13). The processor (13) subsequently outputs (16) the text embedded with an advertisement to a user's peripheral device, and the user's peripheral device displays the text embedded with an advertisement. As described above, this text embedded with an advertisement may include compressed transcripts, advance ASCII copies and the like having searchable indices and editable text. These electronic documents may be saved on the user's peripheral device for viewing and editing at a later time.

Figure 5:
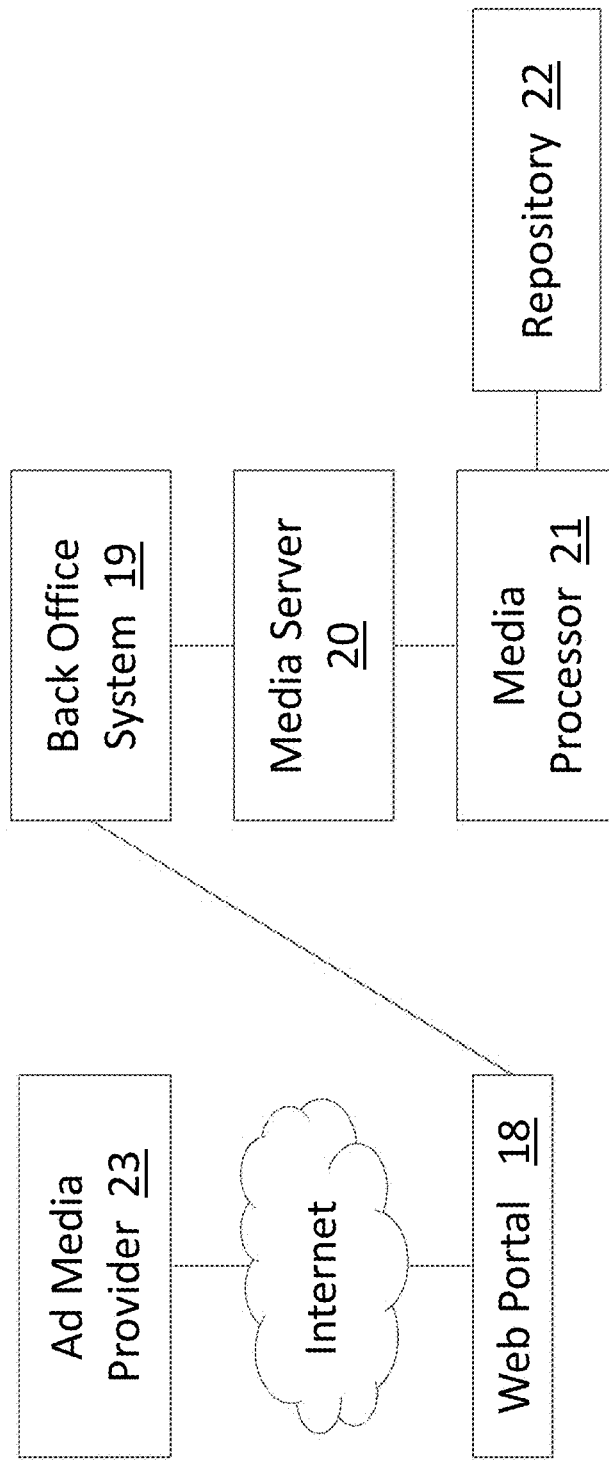
FIG. 5 is a schematic diagram depicting exemplary components used for obtaining and storing advertisements in a repository.

FIG. 5 depicts a schematic illustration in which an ad media provider (23) provides an advertisement to the repository (22) by sending or uploading an advertisement through a web portal (18) interacting with the media server. In certain aspects, the ad media provider includes any third party advertiser or purchaser that has agreed to purchase advertisement space within the transcribed text. Third party purchasers may include, for example, litigation support providers, database providers such as Lexis-Nexis and Westlaw, bar and legal associations, law schools, medical support providers, and the like. In certain aspects, the media server collects the advertisement and communicates the advertisement to the media processor (21). The media processor (21) subsequently catalogs the advertisement by category subject matter type (e.g., litigation, medical, etc.), file type (e.g., PDF file, Flash file, HTML file, ShockWave file, SVG file, GIF, TIF, JPEG, hyperlink, etc.), size, color, etc., and stores the advertisement in the repository until the advertisements are accessed and merged with the transcribed text.

Figure 6:
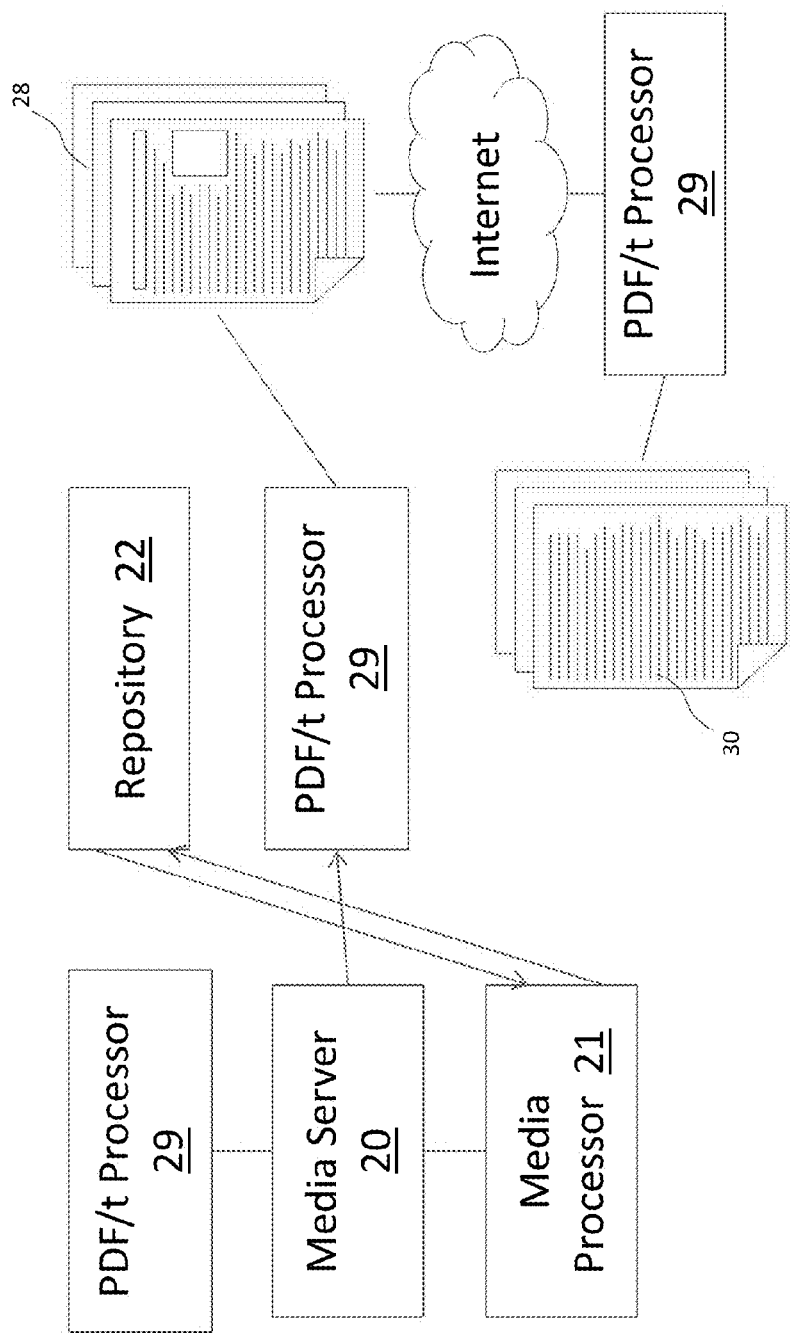
FIG. 6 is a schematic diagram depicting exemplary steps for embedding and removing advertisements from a PDF.

FIG. 6 depicts exemplary steps for embedding advertisements into a PDF document. In certain aspects it is desirable to generate a PDF having the advertisements discussed herein, and more particularly, Adobe PDF format is a desired format to serve as a basis for implementation of the system. Such a format, which may be termed PDF/T ("T" for transcript) may be used with a password provided by a service provider (e.g., a court reporting service). In this aspect, the media server (20) may interact with the media processor (21)

to obtain an advertisement from the repository (22). One or more advertisements collected based on size, shape, color, and/or location is placed within the PDF/T (28) according to the placement purchased by an advertiser. The user may subsequently print a hard copy of the PDF/T (28). After obtaining the PDF/T and if a copy of the text excluding the advertisement is desired, the user can remove the advertisements in the PDF/T by connecting to the PDF/T processor (29) to access a password. Upon entering the password, the use may select a command to remove the embedded advertising. The embedded advertisement will be identified by its file type or tag and subsequently removed from the document. A hard copy of the document having a PDF/A format (30) (i.e., a document without the advertising) will be obtained.

Figure 7:
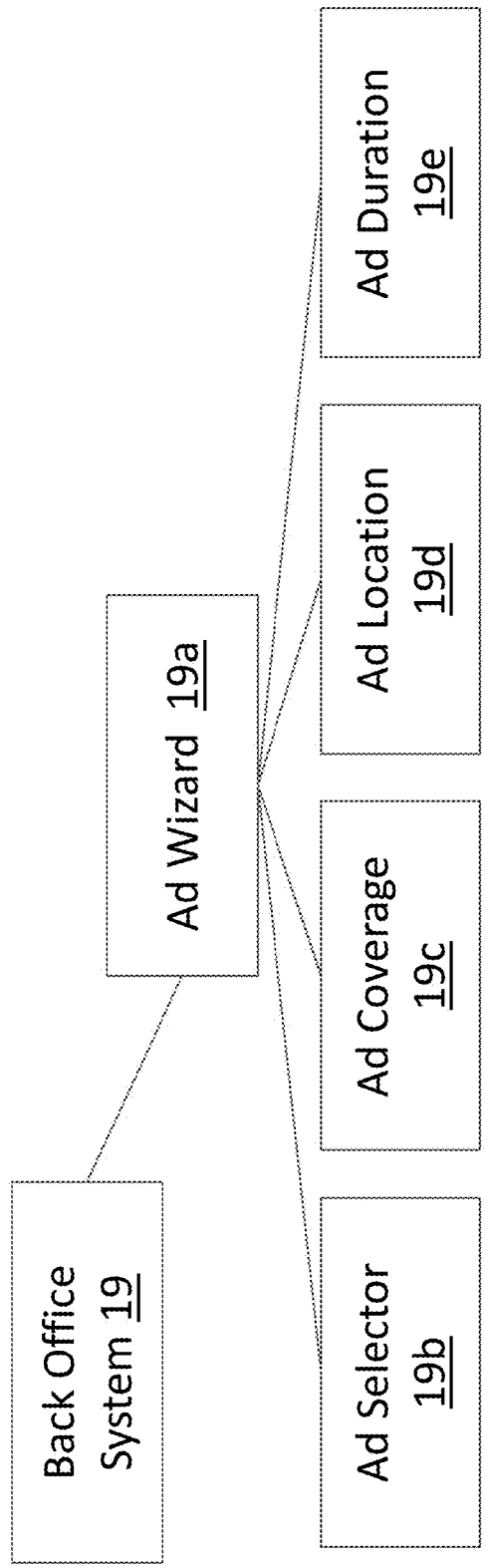
FIG. 7 is a schematic diagram depicting an advertisement module configured to embed an advertisement within a PDF.

In reference to FIG. 6, FIG. 7 depicts an advertisement module (19a) configured to select an advertisement for placement within a document. In certain embodiments, the PDF/t Processor connects to media server. The media server interacts with media processor to pull ad media from repository. In the exemplary embodiments shown in FIG. 7, the back office system (19) uses an ad wizard (19a) or a similar program to process the advertisements being placed into a live real-time feed or PDF/t transcript. In certain aspects, the ad wizard (19a) can selectively interact with various modules including, but not limited to, an ad selector (19b), ad coverage (19c), ad location (19d), and ad duration (19e) either simultaneously or concurrently. For example, the ad wizard may use an ad selector (19b) to choose an advertisement based on target audience, geographic areas, type of litigation or any other criteria for pairing advertising with an audience. The ad wizard may further use ad coverage (19c), which uses algorithms to adjust advertisement size and dimensions for placement based on criteria provided. The ad wizard may further use ad location (19d), which selects the advertisement location inside of the real-time transcript feed or PDF/t transcript for placement based on algorithms and criteria provided. The ad wizard may use ad duration (19e), which sets a time limit on how long the advertisement will be active inside of the real-time transcript feed or PDF/t transcript. In certain embodiments, the back office system (19) indexes the first and last word of a line to maintain the integrity of a transcript.

Figure 8:
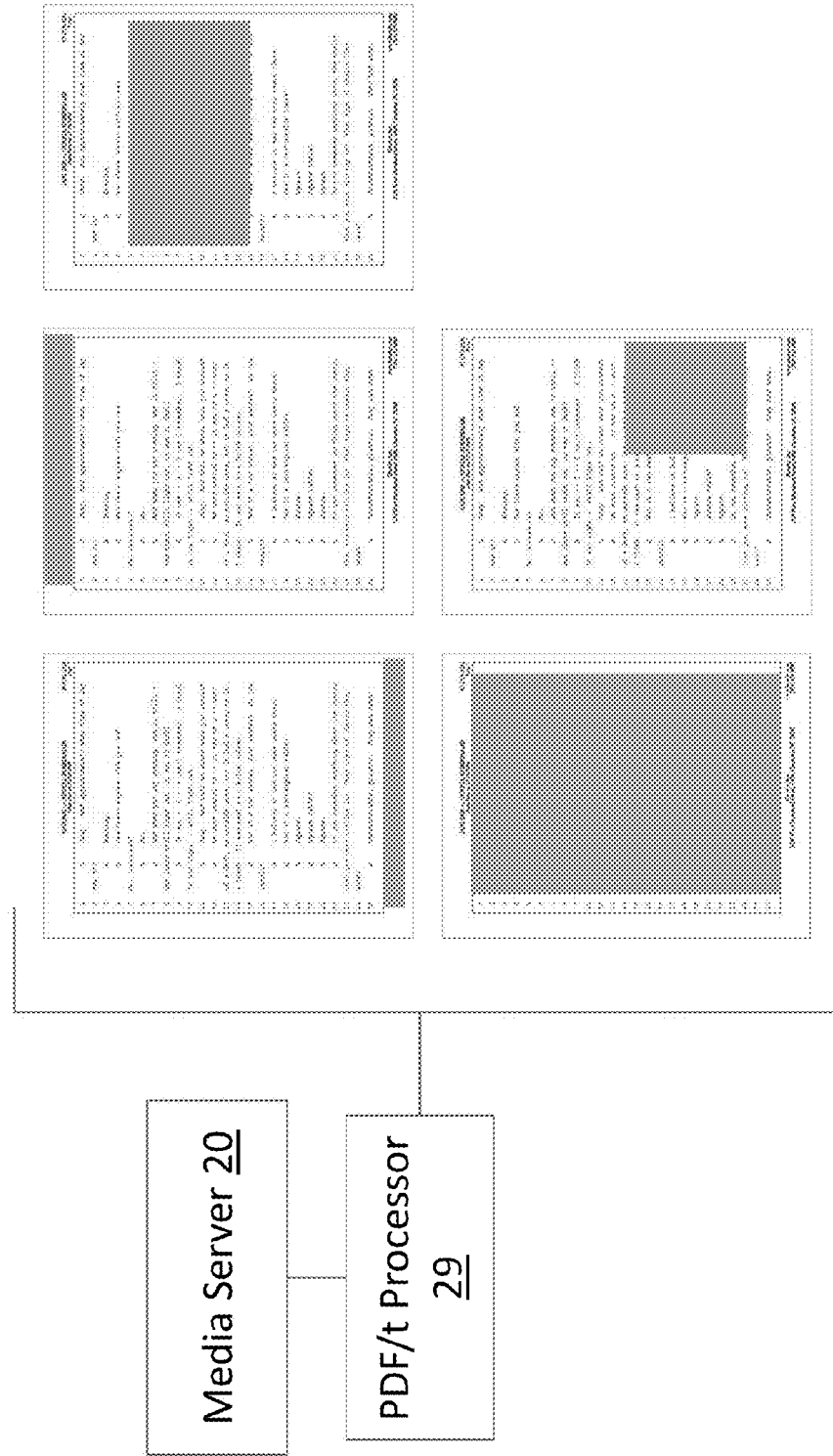
FIG. 8 is a schematic diagram depicting PDF pages with locations where third party advertising may be placed.

Further, in reference to FIG. 6, FIG. 8 depicts the media server (20) connecting to the back office system for ad placement within a PDF. When an advertisement is received, the media server (20) interacts with the PDF/t Processor (29) to place advertisements into real-time transcript feed or PDF/t transcript. As previously described above, sponsored links or advertisements are integrated into the context of the real-time transcript feed or PDF/t. In certain aspects, a party placing an advertisement pays a price according to current value for the market space it is placed. The media server (20) uses updated transcript lines or sections as input to its algorithms for choosing ads to be displayed in connection with those sections. As described above, the media server (20) connects in parallel with the back office system (19) and responds with ads for placement through PDF/t Processor (29). Advertisements are supplied, updated in direct connection with the display of the transcript in the user interface, and are embedded within the PDF/t.

In certain aspects, several advertisers may advertise in the same transcript using software similar to that used to select seats on aircraft to determine location on a first come, first served basis, and the advertisements can be rotated in location throughout the length of the transcript according to predetermined preference. For an additional charge, the advertising can be hyperlinked to the advertiser's website or some other location, and data regarding monthly activity provided to the advertiser using an analytics tool. Advertising can also be charged to the customer on the basis of the number of clicks applied to a particular advertisement.

The computer algorithm also includes a routine that automatically adjusts the transcript line numbers so that, for example, if an advertisement is in the middle of the page, the line numbering proceeds consecutively above and below the advertisement without skipping any line numbers. When the transcript is modified to remove the advertisements, the line numbers shift back into the ordinary location. If necessary, the line numbering of a particular page may shift to a subsequent page while the advertisement is present in order to maintain the integrity of the transcript, permitting the user to copy and paste testimony as usual while maintaining the proper transcript format. The software notes that the transcript includes third party advertising, and the charges to the transcript purchaser is adjusted downwardly according to the court reporting or transcription company's fee schedule. The court reporting or transcription company can preferably track and quantify the number of users accessing and using the system described herein. The court reporting or transcription company can also preferably track and quantify the number of potential users interested in accessing the system described herein. These tracking numbers can be quantified in any desirable metric including, but not limited, number of total users per unit of time (e.g., user's per day, week, month, or year) and/or the number of advertisements displayed per transcribed subject matter (e.g., related to legal subject matter, related to medical subject matter, related to scholarly subject matter, etc.).

In certain aspects, the documents having advertisements can be copied and pasted into another document. When this text is copied and pasted into another document, it is preferable to maintain the text's original format such that the advertisements no longer remain in the copied and pasted text.

A computer-based apparatus and method for inserting material, such as advertising, promotional materials or public service announcements or postings into transcripts, such as deposition, trial and hearing transcripts, captioning, realtime, and computer generated, among others, according to the invention have been described with reference to specific embodiments and examples. Various details of the invention may be changed without departing from the scope of the invention. Furthermore, the foregoing description of the preferred embodiments of the invention and best mode for practicing the invention are provided for the purpose of illustration only and not for the purpose of limitation, the invention being defined by the claims.

We claim:

1. A method for placing and displaying advertising in a document, comprising the steps of:
 (a) steno transcribing text in real-time into a steno transcription device;
 (b) communicating the steno transcribed text from the steno transcription device to a computer configured to embed an advertisement into the steno transcribed text;
 (c) receiving a request from a user to access the steno transcribed text with the embedded advertisement;
 (d) embedding an advertisement in the steno transcribed text,
 (e) communicating the steno transcribed text with the embedded advertisement to a user's peripheral device, and
 (f) removing the embedded advertisement from the steno transcribed text after step (e) while concurrently maintaining original format of the steno transcribed text after removing the embedded advertisement from the steno transcribed text.

2. The method of claim 1, wherein steps (b) and (c) are performed concurrently.

3. The method of claim 1, wherein steps (b) and (c) are performed sequentially.

4. The method of claim 1, wherein the computer comprises an algorithm that permits a user to access the steno transcribed text with the embedded advertisement substantially in real-time.

5. The method of claim 4, wherein the computer is configured to access a password protected setup screen having a prompt for selecting advertisement criteria.

6. The method of claim 5, wherein the advertisement criteria includes at least one feature selected from the group consisting of advertisement size, page location, advertisement color, or any combination thereof.

7. The method of claim 1, wherein the embedded advertisement comprises legally related subject matter, medically related subject matter, or a combination thereof.

8. The method of claim 1, wherein the user's peripheral device comprises a laptop computer, a desktop computer, a tablet, a smart phone, or any combination thereof.

9. The method of claim 1, wherein the steno transcribed text with the embedded advertisement of step (e) is configured for printing.

10. The method of claim 1, wherein the transcribed text of step (f) does not include an advertisement and is configured for printing.

11. The method of claim 1, wherein removing the embedded advertisement from the steno transcribed text occurs while copying and pasting the embedded advertisement from the steno transcribed text into a new document, the embedded advertisement being removed from the new document having only the steno transcribed text pasted therein.

12. A system for embedding advertising into steno transcribed text comprising:
 a computer having a processor, memory, and an advertisement module, wherein:
 the processor is configured to electronically receive steno transcribed text in real-time from a steno transcription machine;
 the processor is configured to electronically communicate with an advertisement module;
 the advertisement module is configured to obtain and embed an advertisement in the steno transcribed text;
 the processor is configured to electronically communicate the steno transcribed text with the embedded advertisement to a user's peripheral device; and
 the processor is configured to remove the embedded advertisement from the transcribed text with the embedded advertisement after being communicated to the user's peripheral device while concurrently maintaining original format of the steno transcribed text after removing the embedded advertisement from the steno transcribed text.

13. The system of claim 12, wherein the processor is configured to convert the steno transcribed text in real-time into a readable medium.

* * * * *